US006978012B2

(12) United States Patent
Casper

(10) Patent No.: US 6,978,012 B2
(45) Date of Patent: Dec. 20, 2005

(54) ECHO CANCELLATION USING A VARIABLE OFFSET COMPARATOR

(75) Inventor: Bryan K. Casper, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 673 days.

(21) Appl. No.: 10/038,159

(22) Filed: Jan. 2, 2002

(65) Prior Publication Data

US 2003/0123649 A1 Jul. 3, 2003

(51) Int. Cl.[7] .............................................. H04B 3/23
(52) U.S. Cl. .................... 379/406.01; 710/305; 326/86
(58) Field of Search . 257/203; 326/21–34; 712/38–40; 328/86, 90; 710/305–317; 379/406.01–406.16

(56) References Cited

U.S. PATENT DOCUMENTS

| 4,651,284 A | * | 3/1987 | Watanabe et al. ............... 716/8 |
| 4,748,666 A | * | 5/1988 | Pope ...................... 379/406.01 |
| 4,754,169 A | | 6/1988 | Morris |
| 4,987,327 A | | 1/1991 | Fernandez et al. |
| 5,563,598 A | | 10/1996 | Hickling |
| 6,201,443 B1 | * | 3/2001 | Tanji ........................ 330/254 |
| 6,226,237 B1 | * | 5/2001 | Chan et al. .................... 710/14 |
| 6,304,106 B1 | * | 10/2001 | Cecchi et al. ................. 326/86 |
| 6,344,756 B1 | * | 2/2002 | Cecchi et al. ................. 326/26 |
| 6,348,882 B1 | | 2/2002 | Ciccone et al. |
| 6,388,495 B1 | * | 5/2002 | Roy et al. ..................... 326/86 |
| 6,388,521 B1 | | 5/2002 | Henry |

OTHER PUBLICATIONS

T. C. Lee and B. Razavi, "A 125-MHz mixed-signal echo canceller for gigabit ethernet on copper wire," IEEE J. Solid-State Circuits, vol. 36, pp. 366-373, Mar. 2001.*
William J. Dally & John W. Poultom, Digital Systems Engineering, Cambridge University Press, 1998, pp. 313-330 and 366-371.

* cited by examiner

*Primary Examiner*—Daniel Swerdlow
(74) *Attorney, Agent, or Firm*—Blakely, Sokoloff, Taylor & Zafman LLP

(57) ABSTRACT

An echo cancellation circuit includes a variable offset comparator whose input is coupled to receive a transmission line analog signal level. The comparator has a substantially variable offset that is digitally controllable to represent an implied, variable reference level. An output of the comparator provides a value that represents a comparison between the analog transmission line signal level and the implied, variable reference level.

18 Claims, 7 Drawing Sheets

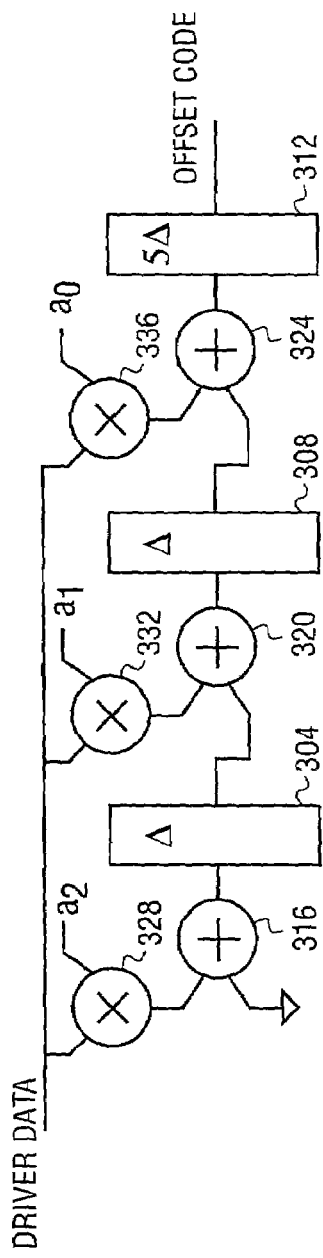
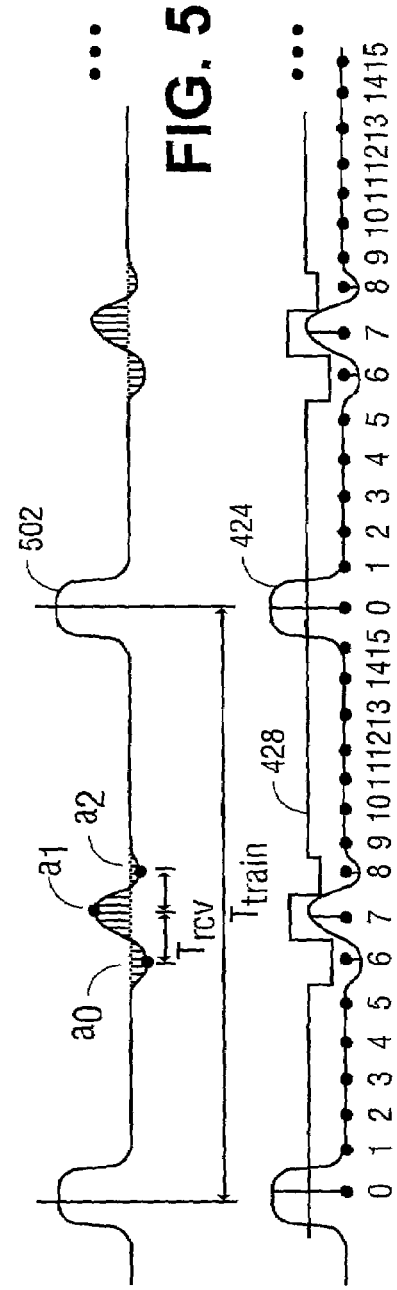
FIG. 3
FIG. 5
FIG. 4

CREATE AN ELECTRONIC DESIGN AUTOMATION (EDA) REPRESENTATION OF AN ECHO CANCELLATION CIRCUIT IN WHICH A VARIABLE OFFSET COMPARATOR IS USED TO OBTAIN A COMPARISON BETWEEN A TRANSMISSION LINE ANALOG SIGNAL LEVEL AND A VARIABLE REFERENCE LEVEL OF THE COMPARATOR.
804

CREATE A REPRESENTATION OF THE CIRCUIT IN WHICH AN ECHO CANCELLATION FILTER HAS AN INPUT COUPLED TO RECEIVE DATA SYMBOLS TO BE TRANSMITTED AND AN OUTPUT COUPLED TO AN OFFSET CONTROL INPUT OF THE COMPARATOR.
808

FIG. 9

ECHO CANCELLATION USING A VARIABLE OFFSET COMPARATOR

The present application may be related to subject matter disclosed in one or more of the following applications that are assigned to the same assignee as that of the present application:

U.S. patent application Ser. No. 09/967,804, "Equalization of a Transmission Line Signal Using a Variable Offset Comparator", filed Sep. 28, 2001.

U.S. patent application Ser. No. 09/968,349, "Multi-Level Receiver Circuit With Digital Output Using a Variable Offset Comparator", filed Sep. 28, 2001.

U.S. patent application Ser. No. 09/967,666, "Voltage Margin Testing of a Transmission Line Analog Signal Using a Variable Offset Comparator in a Data Receiver Circuit", filed Sep. 28, 2001.

U.S. patent application Ser. No. 09/895,625, "Variable Offset Amplifier Circuit", filed Jun. 29, 2001.

U.S. patent application Ser. No. 09/960,821, "A Method and Apparatus for Outbound Wave Subtraction Using a Variable Offset Amplifier", filed Sep. 21, 2001.

U.S. patent application Ser. No. 10/037,751, "A/D Conversion Using a Variable Offset Comparator", filed on the same date as the present application.

BACKGROUND

This invention is in general related to data communications and more particularly to an echo cancellation technique that can be applied to a transmission line signal received by an input/output (i.e., I/O) circuit of an integrated circuit device.

I/O circuits act as the interface between different logic functional units of an electrical system. The functional units may be implemented in separate integrated circuit dies (i.e., IC chips) of the system. These chips may be in separate IC packages that have been soldered to a printed wiring board (i.e., PWB). The chips communicate with each other over one or more conductive transmission lines. The transmission lines may be a parallel bus formed on a PWB, and they may be of the point-to-point or multi-drop variety. Alternatively, the transmission line may be a serial link such as a coaxial cable. In both cases, each chip has an I/O circuit that includes a driver and a receiver for transmitting and detecting symbols. The driver and receiver translate between on-chip signaling and signaling that is suitable for high speed transmission (e.g., at several hundred megabits per second and higher) over a transmission line. In a 'bidirectional link', the driver and receiver pair are connected to the same transmission line.

A problem with high speed data communication is that discontinuities in the transmission line, such as those caused by, for example, PWB connectors or sockets, may cause signal reflections. These reflections are also known as 'echo'. In a bidirectional link, the echo of a data symbol transmitted by a near end driver can distort the transmission line signal at a near end receiver, thereby causing an error when detecting a data symbol that has been transmitted by a far end driver.

To correct for echo at the near end receiver, a digital echo cancellation process may be used. In such a technique, the received transmission line signal is first digitized at a very high sampling rate (which is significantly higher than the data symbol transmission rate of the link). An estimated, digital correction value is then added to each sample of the digitized transmission line signal, to yield an 'echo cancelled' version of the signal. This echo cancelled signal is then translated into a sequence of data symbol values (such as logic values '0' and '1' for a binary communication link) by comparing the samples to a digital, reference value.

Each estimated correction value can be determined by a discrete time, echo cancellation filter, based upon data symbols previously transmitted by the near end driver. The characteristics of this filter can be adapted, for example, during a calibration or training period in which known symbols are transmitted by the near end and far end drivers. The filter characteristics are selected so that the comparisons between the corrected samples and the fixed reference value yield the sequence of data symbols which were transmitted by the far end driver. Thereafter, with the filter calibrated in this manner, random sequences of data symbols transmitted by the far end can be expected to be properly detected despite the presence of echo (being a reflection of a near end transmission) in the transmission line signal.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

FIG. 3 depicts a symbolic representation of a digital FIR filter.

FIG. 4 shows a transmission line signal waveform and an implied variable reference label waveform.

FIG. 5 depicts a transmission line signal waveform containing a sequence of periodic training pulses in which echo distortion portion has been digitized.

FIG. 9 shows a flow diagram of an exemplary computer aided design methodology.

DETAILED DESCRIPTION

An echo cancellation process and apparatus are described which are capable of correctly detecting far end transmitted data symbols at a near end receiver, in the presence of echo (such as near end crosstalk) due to a near end transmission. The process and apparatus may be implemented at a lower cost and perhaps consume less power than the conventional, all digital echo cancellation methodology. The process and apparatus use a variable offset comparator (i.e., VOC). According to an embodiment, the VOC has a substantially variable, digitally controllable offset and can be implemented using a standard, digital complimentary metal oxide semiconductor (i.e. CMOS) fabrication process, on the same integrated circuit chip as large scale integration logic. Use of such a VOC (with digitally controllable offset) enables an easy calibration operation for the echo cancellation capability of an I/O circuit, to cancel inaccuracy inducing effects such as device mismatch and comparator offsets. Additionally, power consumption may be reduced in the I/O circuit as high sampling rate A/D conversion of the transmission line signal during normal operation (i.e. detection of valid, data symbols) is not required.

Figure 1:
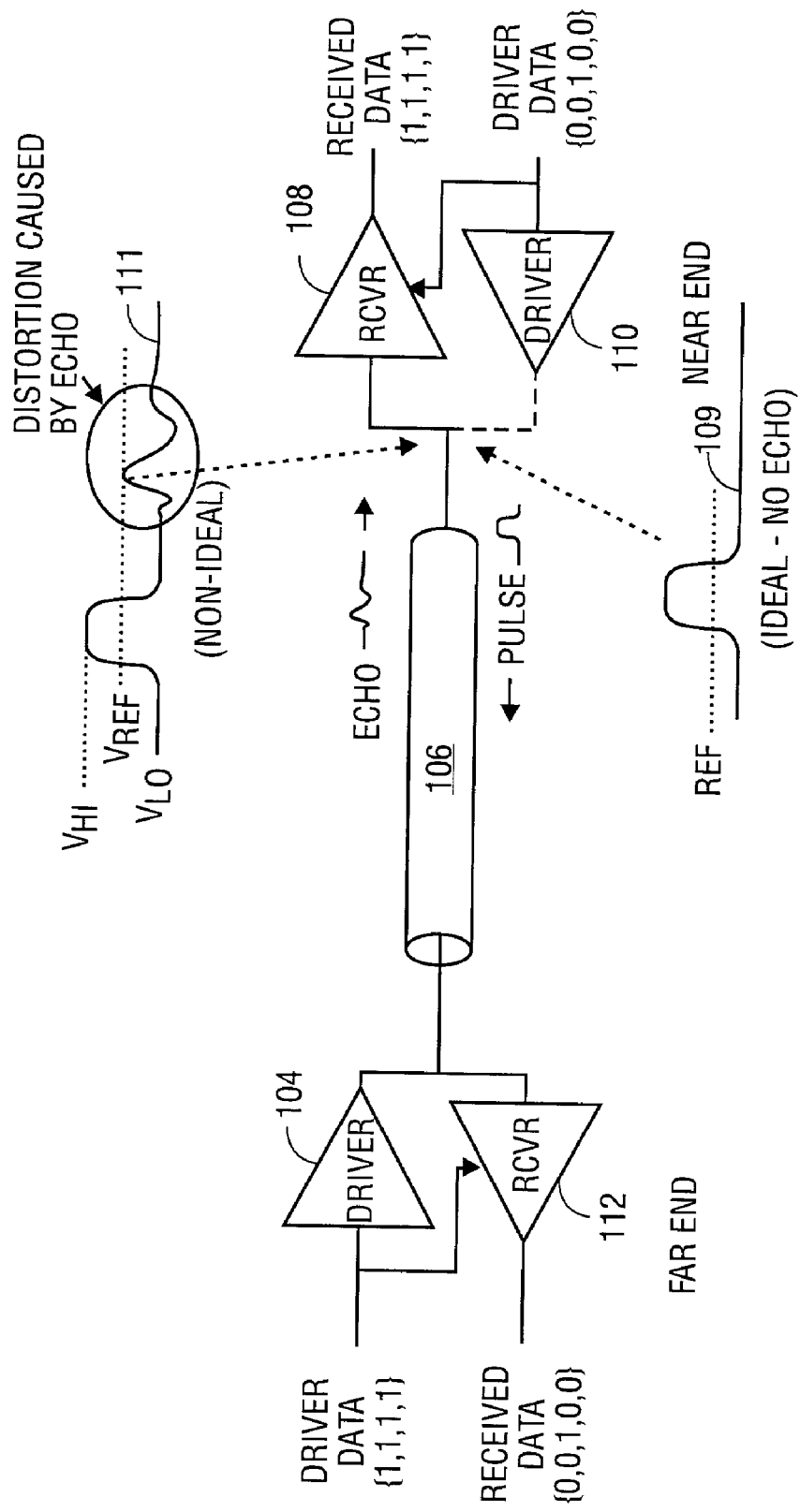
FIG. 1 shows a block diagram of a bidirectional data communication link.

Referring first to FIG. 1, this figure will help explain the various embodiments of the echo cancellation process and apparatus. This figure shows a block diagram of a high speed data communication link that features a far end driver 104 and a far end receiver 112 coupled to a near end receiver 108 via a transmission line 106. If the link is bidirectional, a near end driver 110 may be connected to the same transmission line 106. The bidirectional nature of the link means that the same transmission line is used to both receive and transmit data by either the near end or the far end. The driver 110 may be formed on the same integrated circuit die as the echo cancellation circuit and is coupled to transmit the driver data symbols on either the same transmission line 106 from which the analog signal level fed to the VOC input is derived, or on a neighboring transmission line (not shown in FIG. 1). The figure also shows an exemplary transmit sequence of data symbols (also referred to as driver data) being fed to the near end driver 110, as (0, 0, 1, 0, 0). In the bidirectional embodiment, this driver data is expected to be received by the far end receiver 112 as shown, by enabling the receiver 112 to detect each data symbol in a received transmission line signal. Simultaneously with the near end driver 110 transmitting its pulse sequence, the far end driver 104 is kept 'quiet' in the sense that no pulse is transmitted by the far end driver 104.

Each data symbol in a transmit sequence may be mapped to a unique signal level, in this case a low voltage $V_{lo}$ and a high voltage $V_{hi}$, according to a driver clock signal (not shown) whose period is $T_{drv}$. It should be noted that the voltage levels discussed here are merely intended to illustrate the operation of the echo cancellation scheme and are not intended to limit the scope of the invention. Those of ordinary skill in the art recognize that a range of signal levels may be used in the operation of the transmission link. The examples described below are compatible with a binary communication link in which each symbol to be transmitted can have only one of two values (logic '1' and logic '0'). In general, however, the echo cancellation scheme is compatible with multi-level transmission links. For instance, if a four pulse amplitude modulation (i.e., 4 PAM) link is used, then each symbol can have one of four values (e.g., 0, 1, 2, and 3). The embodiments of the echo cancellation process and apparatus described below would be modified in that case to have the ability to detect multiple levels in the transmission signal. See U.S. patent application Ser. No. 09/968,349 of Casper entitled "A Multilevel Receiver Using a Variable Offset Comparator", filed Sep. 28, 2001, and assigned to the same Assignee as that of the present application.

Given the above described scenario, under ideal circumstances, the near end receiver 108 would experience a transmission line signal 109 as shown that contains no echo. To detect the data symbols {1, 1, 1, 1} transmitted by the far end driver 104, the near end receiver 108 may first periodically sample the transmission line signal at a predefined frequency and phase (in relation to the rate at which the symbols were transmitted). Then, the effect of the sequence of data transmitted by the near end driver 110 (the so-called 'outbound wave') would be subtracted from the samples. Finally, this outbound wave subtracted sample is compared to a reference value to yield the symbol value.

In practice, however, the transmission line signal that is sampled by the receiver 108 may resemble the signal 111 rather than the signal 109, where the signal 111 includes some distortion which can be attributed to echo due to the pulse (outbound wave) transmitted by the near end driver 110 a little earlier in time. It can be seen that the receiver 108 is faced with a problem in that for the given reference level shown (used to translate the samples into symbol values '0' or '1'), the sampled echo comes very close to the reference level and therefore risks yielding an incorrect symbol value. This problem is also referred to as reduced voltage margin, since the margin of noise that can be tolerated by the receiver when the transmission line signal contains echo distortion has been drastically reduced.

Figure 2:
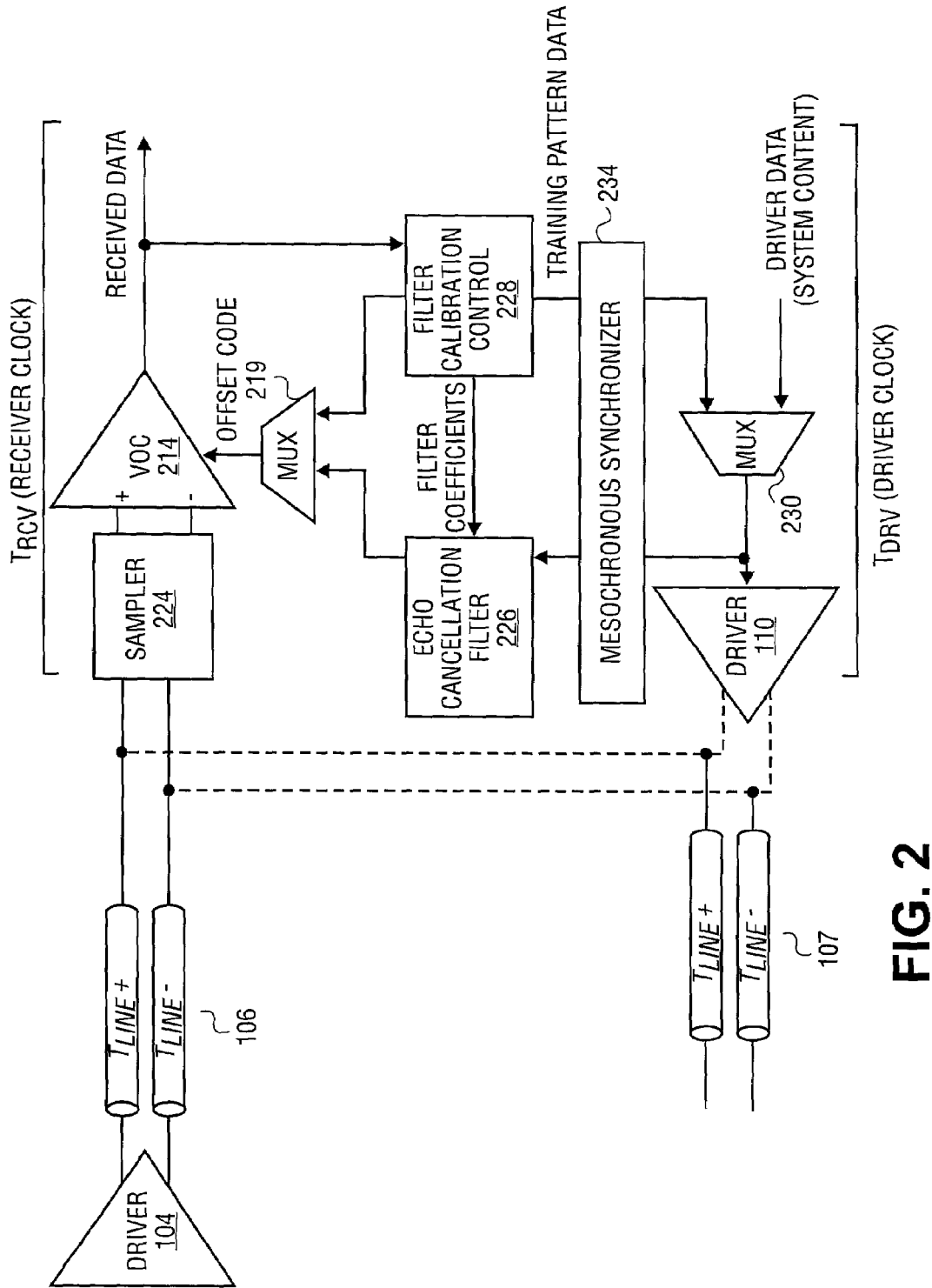
FIG. 2 shows a block diagram of a modified communication link in which an echo cancellation circuit is provided in the receiver.

According to an embodiment of the invention, the correct sequence of data symbols may be recovered by the receiver 108 modified as shown in FIG. 2, with much improved voltage margin. FIG. 2 shows an embodiment of an echo cancellation circuit that can automatically vary an implied reference level of a VOC 214, to avoid the distortion caused by echo in a received transmission line signal. It should be noted that rather than correcting the digitized transmission line signal (by adding a correction value to each sample to literally cancel the echo distortion present in that sample), the embodiments of the invention avoid the echo distortion by shifting the implied reference level of the VOC 214 prior to translating an analog signal level into its corresponding data symbol value. Thus, although the term 'echo cancellation' will still be used in describing the various embodiments of the invention, it should be appreciated that this is mostly for enabling a rapid understanding of the application of the invention to echo distortion problems.

Assuming the communication link can be modeled as a linear time invariant system, the circuitry of FIG. 2 may avoid echo distortion under a wide range of near end transmissions (including random sequences) that may be linear combinations of a pulse sequence such as, for example, the one shown in FIG. 1 being (0, 0, 1, 0, 0). Of course, the circuitry may alternatively be designed to work with other near end transmit pulse sequences such as, for example, (1, 1, 0, 1, 1). In addition, the near end transmissions that cause the echo may be on the same transmission line 106 or on a neighboring line 107. In the latter case, the echo is also referred to as crosstalk.

The near end receiver 108 has been modified to include a VOC 214 whose input is coupled to receive a transmission line analog signal level. In the embodiment shown in FIG. 2, the VOC input and the transmission line signal are differential rather than single ended, to help reduce common mode noise. Alternatively, a single ended to differential input stage or other modification may be added, to receive a single ended transmission line signal, if the application uses such signals.

The transmission line signal level is compared to an implied reference level of the VOC 214. The VOC 214 has a substantially variable offset that is controllable to represent the implied, variable reference level. In other words, varying the reference of the VOC 214 is performed by changing its offset.

Figure 7:
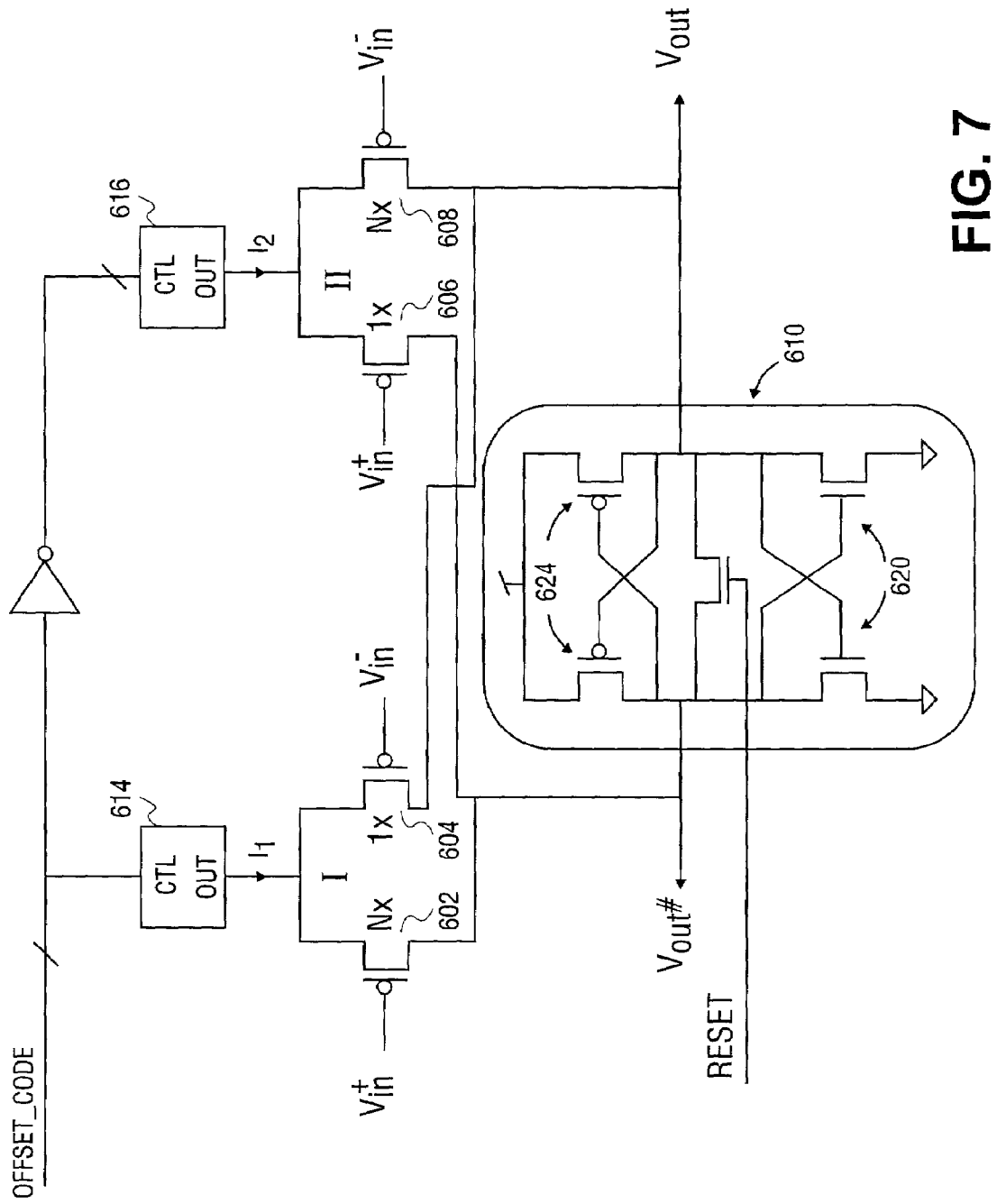
FIG. 7 shows a circuit schematic of an exemplary variable offset comparator.

The output of the VOC 214 provides a logic value of '0' or '1' (which, in the case of a binary communication link, may also be considered to be the received data) being a result of a comparison between the transmission line signal level and the implied, variable reference level. An embodiment of the VOC 214 is described in U.S. patent application Ser. No. 09/895,625 of Casper, entitled "Variable Offset Amplifier", filed on Jun. 29, 2001 and assigned to the same assignee as that of the present application. FIG. 7 to be described further below shows an exemplary circuit schematic of the VOC.

The echo cancellation circuit includes an echo cancellation filter 226 whose output is coupled to the offset control input of the VOC 214 via a multiplexer (i.e. MUX) 219. According to an embodiment, the filter 226 is a discrete time filter whose input is coupled to receive driver data symbols that will be transmitted by a driver 110 in an outbound wave. According to an embodiment, the filter 226 may be implemented as a digital finite impulse response (i.e., FIR) filter whose output is coupled to the offset control input of the VOC 214. In such embodiments, the offset control input is a digital input to receive a binary value also referred to here as an 'offset code'. The discrete time filter provides a binary variable that changes in response to a sequence of driver data symbols that are being transmitted by the near end driver 110.

As will be described further below, the offset code provided to the VOC 214 may be further modified by other mechanisms added to the receiver. In such cases, the binary value at the output of the filter 226 may be added to additional binary values to form a resultant offset code that is fed to the VOC 214. An example below involves adding a binary value that represents a subtraction of an outbound wave being transmitted by the near end driver 110, where such outbound wave subtraction is useful in transmission links that accommodate simultaneous bidirectional signaling as opposed to merely bidirectional signaling.

The response of a discrete time filter may be determined by its coefficients $a_0, a_1 \ldots$. These coefficients are used in an exemplary FIR filter shown in FIG. 3. In this example, the filter has three delay elements 304, 308, and 312 where the latter provides the output offset code that may be fed directly to the offset control input of the VOC 214. The coefficients $a_0, a_1 \ldots$ are fed to respective multipliers 328, 332, and 336 whose other input receives the sequence of driver data symbols. The outputs of the multipliers are combined using adders 316, 320, and 324.

The number of coefficients $a_0, a_1 \ldots$ as well as their values can be determined by a filter calibration control unit 228 (see FIG. 2) during a calibration process. During the calibration process, the filter calibration control unit 228 may need to directly control the offset of the VOC 214 (hence the presence of the MUX 219). The filter calibration control unit 228 generates a training pattern which is a sequence of known data symbols that are provided to an input of the MUX 230. Depending upon the mode of operation, that is either calibration or normal operation, the MUX 230 provides either valid driver data or the training pattern to the input of the near end driver 110. An exemplary calibration process will be described further below.

According to an embodiment, the received data provided by the VOC 214 is obtained in a precisely timed sequence with period $T_{rcv}$, while the driver 110 transmits the data symbols according to a precisely timed sequence having period $T_{drv}$. These precise periods are provided by clock signals that may be referred to as the receiver and driver clock signals, respectively. In general, it is desirable that the driver and receiver clock phases and frequencies track. For instance, it may be desirable to generate the near end receiver clock from the near end driver clock to help reduce the amount of jitter. In addition, assuming that the frequencies of the driver and receiver clocks are the same, a mesochronous synchronizer 234 should be used to phase shift the sequence of training pattern data and valid driver data, so that the offset codes that are fed to the VOC 214 are presented at the correct time intervals and with adequate timing margins in relation to the receiver clock. This may be achieved by positioning the synchronizer 234 as shown, between the input to the rear end driver 110 and the input to the echo cancellation filter 226. Although not explicitly shown, the techniques for applying the receiver and driver clock signals can be determined by those of ordinary skill in the art. For instance, the receiver clock signal may be used to enable a sampler 224 or the VOC 214, or a subsequent latch stage that couples to the output of the VOC 214. Similarly, the driver clock signal may be introduced at the driver 110, or it may be introduced earlier (for example at the MUX 230) to time the sequences of driver data and training pattern data that are fed into the MUX 230.

In the embodiment of FIG. 2, a sampler unit 224 is coupled between the VOC input and the transmission line 106. This sampler unit 224 may be implemented using a sample and hold circuit whose output is to provide the transmission line analog signal level. The sampler unit 224 may help reduce jitter in the received data. In such an embodiment, the sampler unit 224 is clocked by the receiver clock signal that may be phase and frequency locked to the driver clock signal. In another embodiment the sampler unit 224 is not used and the transmission line signal is fed directly to the input of the VOC 214. In such a case, the VOC 214 or its latched output may be timed by the receiver clock.

In general, as suggested above, the driver data should be transmitted as synchronized to the driver clock signal, while the receive data should be detected according to the timing provided by the receiver clock signal, where the receiver and driver clocks are phase and frequency locked. Referring back to FIG. 1, the near end driver 110 and near end receiver 108 may in general be of the source synchronous variety in which a clock or strobe signal is transmitted (not shown) in sync with the data, and the receiver clock is derived from the received clock or strobe. However, other alternatives for obtaining the receiver and driver clock signals may be possible.

According to another embodiment, transmission line termination resistors (not shown) are coupled to the transmission line 106 in front of the sampler unit 224 (see FIG. 2). In yet another embodiment, electrostatic discharge protection circuitry (also not shown) is coupled to the transmission line 106 in front of the sampler unit 224. Other types of circuitry well known to those of ordinary skill in the art may be included in the near end circuitry.

Referring now to FIG. 3, what is shown is a symbolic representation of an exemplary digital FIR filter suitable for use in the echo cancellation circuit of FIG. 2. This particular filter design has three delay elements that can store the results of a linear operation on past driver data. The values of the filter coefficients $a_0, a_1 \ldots$ are to be selected in view of the distortion caused by the echo as well as in view of the transmitted data symbols that led to the echo. FIG. 4 shows two waveforms that are useful in understanding the operation of the echo cancellation circuit and in particular the action of the FIR filter. The transmission line signal 424 is a result of a training pattern (a series of pulses) having been transmitted by the near end driver 110 (see FIG. 1) with distortion due to echo being present in between the pulses. FIG. 4 also shows an implied VOC reference waveform 428. Note how the implied reference level changes prior to taking certain samples of the transmission line waveform 424. The echo cancellation filter 226 and the mesochronous synchronizer 234 ensure that the reference level is timely changed prior to allowing the VOC to perform a comparison between the reference level and the distortion laden transmission line signal level. By changing the implied reference level of the VOC in this manner, it can be seen that the voltage margin of the VOC is improved during the distortion sequence.

Voltage margin in this case is defined as the difference between the expected transmission line signal level and the implied VOC reference level at the time of the comparison. The voltage margin is a measure of how much noise in the analog transmitted signal can be tolerated by the receiver, before the receiver output yields the wrong symbol value. It is thus instructive to note, for instance, that the voltage margin for the seventh sample in the first training pulse is significantly greater than the voltage margin in the non-ideal situation in which no echo cancellation is used (see FIG. 1).

Figure 6:
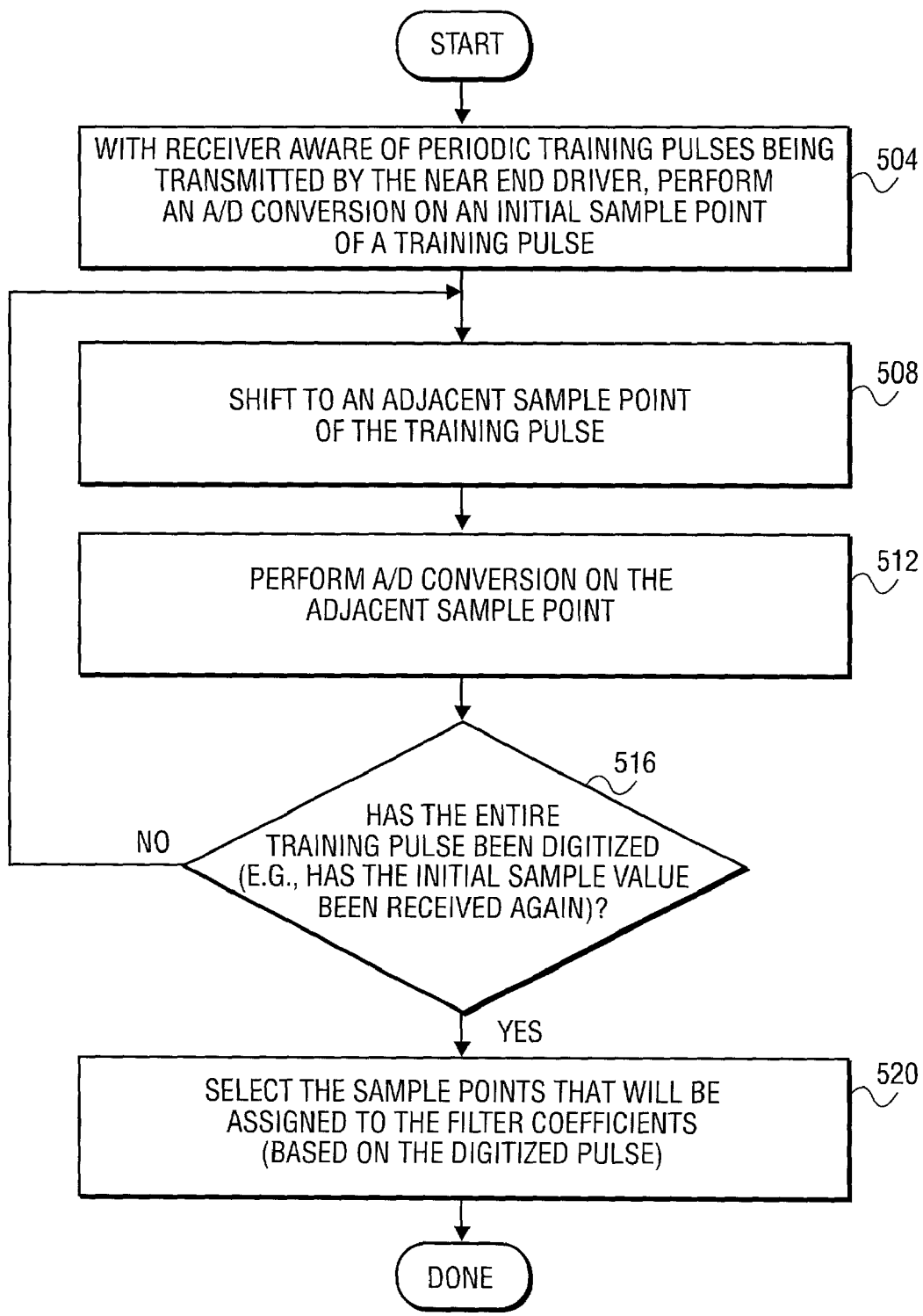
FIG. 6 illustrates a flow diagram of an exemplary calibration process.

To determine the coefficients of the echo cancellation filter, a calibration process may be performed by which the amplitudes of the various peaks that appear in the distortion produced by echo in the transmission line signal are given binary values. FIG. 6 illustrates a flow diagram of an embodiment of a process for digitizing a received training pulse that is being periodically repeated. The process results in assigning binary values to consecutive samples of the distortion that has been caused by an echo of the training pulse that has been previously transmitted.

Referring briefly to FIG. 5, the periodic training pulses are part of the waveform 502. The electronic system should be designed so that the receiver is aware that a training pulse, rather than valid driver data, is being periodically detected by the near end receiver. The pulses should be sufficiently spaced apart in time to allow the transmission line to settle (e.g., to allow reflections of a pulse to die out before each subsequent pulse is transmitted).

Returning to FIG. 6, operation begins with an analog to digital (i.e. A/D) conversion on an initial sample point of a training pulse, where this sample point has a non-zero signal level (operation 504). This conversion may be performed by the near end receiver itself, using the VOC 214 as connected in FIG. 2 according to a successive approximation A/D conversion process. See, e.g., U.S. patent application Ser. No. 10/037,751, entitled "A/D Conversion Using a Variable Offset Comparator", field on the same date as the present application and assigned to the same assignee as that of the present application. Alternatively, other A/D conversion procedures may be used, including those that are performed by a dedicated, off-chip integrated circuit test system rather than an on-chip A/D conversion technique in the receiver. The process continues with operation 508.

In operation 508, a shift is performed to an adjacent sample point of the training pulse. The spacing between adjacent sample points should be small enough so that the pulse is sufficiently digitized to yield useful signal levels in view of the pulse width and in view of the echo distortion. After shifting to the adjacent sample point, the A/D conversion is repeated for that new sample point (operation 512). Operations 508 and 512 are thus repeated until the entire training pulse has been digitized (operation 516). One way to decide when the entire pulse has been digitized is to stop when the digitized signal level of the pulse has returned to its initial value computed in operation 504.

Once the pulse has been digitized in its entirety (including the echo distortion portion as for instance shown in the waveform 502 of FIG. 5), the process continues with operation 520 in which sample points that will be assigned to the filter coefficients $a_0$, $a_1$, . . . will be selected from the echo distortion portion of the digitized pulse. The samples for the coefficients are selected based upon the frequency of the driver and receiver clock signals. For instance, the separation between the samples may be exactly equal to the driver or receiver clock signal period $T_{rcv}$. With the coefficients $a_0$, $a_1$, . . . being set to the sample values shown in FIG. 5, the output of the echo cancellation filter 226 (see FIG. 2) will lower or increase the implied reference level of the VOC 214 (according to the waveform 428 in FIG. 4) in response to a sequence of data symbol values that are being input to the driver 110.

If the receiver voltage margin as measured during the filter calibration process were to remain the same thereafter, during normal operation of the receiver, then the coefficients of the filter 226 once calibrated would remain optimal. However, the voltage margin may change during normal operation due to environmental factors such as increased attenuation in the transmission line as well as due to other factors. To keep the voltage margin uniform under such circumstances, the filter coefficients may be adapted to maintain this uniformity by, for instance, periodically detecting the voltage margin and in response, using for example a least means square algorithm, modifying the filter coefficients to maintain the uniform voltage margin.

Turning now to FIG. 7, this figure depicts a circuit schematic of an embodiment of the VOC 214. The comparator circuit includes an amplifier circuit including first and second differential pairs which are defined by transistors 602, 604 and 606, 608, respectively. Variable current generators 614 and 616 are also coupled to control the tail currents $I_1$ and $I_2$ to the respective differential pairs. These current generators 614, 616 are controlled by a digital value known as the 'offset code' (see FIG. 2) that is received on multiple, offset select lines as shown. In this embodiment, each digital value of the offset corresponds to two oppositely varying tail currents $I_1$ and $I_2$ that are equidistant from a nominal tail current.

A single ended output voltage for this comparator may be available as either $V_{out}$ or $V_{out}\#$. To drive these output signals into one of two possible stable states, a regenerative load circuit 610 is provided as shown. After being reset by an input signal, this regenerative load circuit 610 will quickly amplify any difference between $V_{out}$ and $V_{out}\#$, where such amplification occurs at a relatively high gain due to the cross coupled n-channel pair 620 and p-channel pair 624, thereby ensuring that the output signals $V_{out}$ and $V_{out}\#$ only assume one of two possible stable states. Thus, if $V_{in}^+$ is greater than $V_{in}^-$ by at least the amount of offset that has been selected (as referred back to the input of the differential pairs), then the regenerative latch circuit 610 forcefully drives $V_{out}$ to a low voltage level and simultaneously drives $V_{out}\#$ to a high voltage level. Other types of regenerative latch circuits may be used to provide the digital type output signal typically associated with a sense amplifier or a comparator application.

Figure 8:
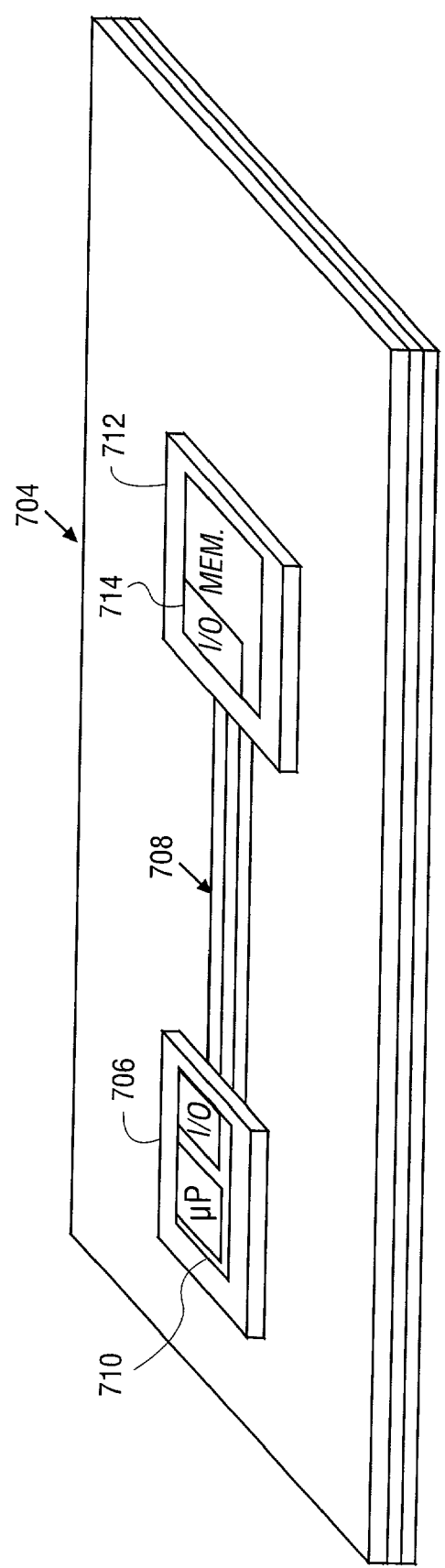
FIG. 8 depicts a block diagram of an electronic system.

Turning now to FIG. 8, what is shown is a block diagram of an embodiment of an electronic system in which a communication link features the echo cancellation circuit described above. The system has a multi-layer printed wiring board 704 on which a parallel bus 708 is formed. The bus 708 may be of the point to point variety, or a multi-drop bus such as those used in a main memory. An integrated circuit (IC) chip package 706 is operatively installed on the board to communicate using the parallel bus 708. The installation of the package 706 may be done by a surface mount technique or via a connector or socket. The package has an IC chip 710 that includes a logic function section, and an I/O section as an interface between the logic function section and the bus 708. The logic function suction may be one of the following well-known devices: a microprocessor, a memory controller, and a bus bridge. Alternatively, other devices that can be implemented in the logic function section of an IC chip may be used. The I/O section has a bus receiver in which an echo cancellation circuit as described above is provided.

A second IC package 712 is also installed on the board 704 to communicate with the first package 706 via the bus 708. The second IC package 712 also includes a chip 714 having an I/O section in which a bus receiver is provided to interface the bus 708, and its own logic function section (here shown as a memory controller).

According to an embodiment, the I/O interfaces of the two chips 710 and 714 communicate with each other bi-directionally, that is using the same conductive lines of the bus for both transmitting and receiving data. Thus, in such an embodiment, drivers are provided, in both IC chips, that are connected to the same conductive lines of the bus 708. Other system applications of the echo cancellation circuit are possible, including, for example, a cable receiver.

Referring now to FIG. 9, what is shown is a flow diagram of an embodiment of a computer-implemented method for designing the echo cancellation circuit. The various embodiments of the circuit described above may be designed using conventional computer-aided design and electronic design automation tools. The method involves the creation of a representation of the circuit in which a comparator has an input to receive the transmission line analog signal level (operation 804). The comparator has a substantially variable offset that is controllable to represent a variable reference level. An example of such a comparator was described above in connection with FIG. 7. The representation of the circuit is understood to provide at the output of the comparator a value that represents a comparison between the transmission line analog signal level and the variable reference level.

The method also includes creating a representation of an echo cancellation filter for the circuit, where an input of the filter is coupled to receive data symbols to be transmitted by the near end driver. An output of the echo cancellation filter is coupled to an offset control input of the comparator (operation 808). As was mentioned above, representation of the echo cancellation filter may be, for instance, as a digital FIR filter whose output is coupled to provide the offset code for the comparator.

In general, the representations of all embodiments described above may be created using conventional computer-aided design and electronic design automation tools that are well known to those of ordinary skill in the art. After the representation of the circuit has been created, it may be stored in digital form, as part of, for instance, a hardware description language file in a fixed or portable computer memory device, such as a hard disk drive or a compact disc. This file contains instructions that, when executed by a machine such as a computer work station, cause the machine to display and perhaps simulate operation of the echo cancellation circuit as part of a larger system.

To summarize, various embodiments of an echo cancellation technique have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A circuit comprising:
    an echo cancellation circuit in which a comparator has a differential input coupled to receive a differential transmission line analog signal level, the comparator having a discrete time variable offset that is controllable via an offset control input to represent a variable reference level, an output of the comparator to provide a value that represents a comparison between the differential transmission line analog signal level and the variable reference level; and
    a driver on the same integrated circuit die as the echo cancellation circuit and coupled to transmit driver data symbols,
        and wherein the echo cancellation circuit further includes a discrete time echo cancellation filter whose input is coupled to receive the driver data symbols and whose output is coupled to the offset control input of the comparator.

2. The circuit of claim 1 wherein the filter includes a digital finite impulse response filter whose output is coupled to the offset control input of the comparator.

3. The circuit of claim 1 wherein the offset control input is a digital input to receive a binary value.

4. The circuit of claim 1 further comprising a sample and hold circuit whose output is coupled to provide the differential transmission line analog signal level to the comparator.

5. The circuit of claim 1 wherein the comparator differential input is provided by first and second differential pairs each being intentionally unbalanced, each pair having first and second output nodes, the first output node of the first pair being coupled to the second output node of the second pair, the second output node of the first pair being coupled to the first output node of the second pair, and first and second variable current generators coupled to control respective tail currents of the first and second differential pairs.

6. The circuit of claim 1 wherein the driver is coupled to transmit on the same transmission line from which the analog signal level is derived.

7. A method comprising:
    determining a binary value based on a sequence of data symbols that have been transmitted by a near end driver in a communication link, the binary value being one of a plurality of binary values that are designed to increase a voltage margin of a near end receiver in the presence of echo in the communication link; and
    applying the binary value to an offset control input of a comparator in the near end receiver, and applying a differential transmission line analog signal level of the communication link to a differential input of the comparator, the comparator having a variable offset that is controllable, via the offset control input, to represent a variable reference level, an output of the comparator to provide a value that represents a comparison between the differential transmission line analog signal level and the variable reference level.

8. The method of claim 7 wherein the plurality of binary values are a sequence determined by a discrete time filter in response to receiving the sequence of data symbols.

9. The method of claim 8 further comprising, before determining the binary value, transmitting a training pattern of data symbols in the communication link and determining a plurality of coefficients of the discrete time filter based on the training pattern and using the comparator to detect the training pattern, wherein the coefficients are designed to enable the filter to vary an offset of the comparator so that a voltage margin of the near end receiver is increased in the presence of echo.

10. The method of claim 9 wherein the coefficients are designed to enable the filter to further vary the offset of the comparator so that an outbound wave is subtracted from the transmission line signal.

11. The method of claim 7 further comprising using a sample and hold circuit to obtain the transmission line signal level.

12. A system comprising:
a printed wiring board on which a bus is formed, an integrated circuit (IC) chip package being operatively installed on the board to communicate using the bus, the package having an IC chip that includes a logic function section and an I/O section as an interface between the logic function section and the bus, the I/O section having a bus receiver in which an echo cancellation circuit includes a comparator that has a differential input to receive a differential bus analog signal level, the comparator having a variable offset that is controllable to represent a variable reference level, an output of the comparator to provide a value that represents a comparison between the differential bus analog signal level and the variable reference level, wherein the comparator differential input is provided by first and second differential pairs each being intentionally unbalanced, each pair having first and second output nodes, the first output node of the first pair being coupled to the second output node of the second pair, the second output node of the first pair being coupled to the first output node of the second pair and first and second variable current generators coupled to control respective tail currents of the first and second differential pairs.

13. The system of claim 12 wherein the logic function section is a microprocessor.

14. The system of claim 12 wherein the logic function section is a memory controller.

15. The system of claim 12 wherein the logic function section is a bus bridge.

16. The system of claim 12 further comprising a driver on the same integrated circuit die as the echo cancellation circuit and coupled to transmit driver data symbols and wherein the echo cancellation circuit further includes a discrete time echo cancellation filter whose input is coupled to receive the driver data symbols and whose output is coupled to an offset control input of the comparator.

17. An article of manufacture comprising:
a machine-readable medium having instructions stored thereon which, when executed by a processor, cause an electronic design automation tool to simulate an echo cancellation circuit in which a comparator has a differential input to receive a differential transmission line analog signal level, the comparator having a variable offset that is controllable to represent a variable reference level, an output of the comparator to provide a value that represents a comparison between the differential transmission line analog signal level and the variable reference level, a driver on the same integrated circuit die as the echo cancellation circuit and coupled to transmit driver data symbols received at its input and wherein the echo cancellation circuit includes a discrete time echo cancellation filter whose input is coupled to receive the driver data symbols and whose output is coupled to a discrete time offset control input of the comparator.

18. The article of manufacture of claim 17 wherein the comparator includes first and second differential transistor pairs each being intentionally unbalanced, each pair having first and second output nodes, the first output node of the first pair being coupled to the second output node of the second pair, the second output node of the first pair being coupled to the first output node of the second pair, and first and second variable current generators coupled to control respective tail currents of the first and second differential pairs.

* * * * *